United States Patent [19]

Korcusko et al.

[11] Patent Number: 4,484,716
[45] Date of Patent: Nov. 27, 1984

[54] DEVICE FOR SEPARATING A COIL OF SHEET METAL FROM A CONSTRUCT

[75] Inventors: Peter J. Korcusko, Colonia; Fred R. Bohl, Chatham, both of N.J.

[73] Assignee: Ruesch Machine Company, Inc., Springfield, N.J.

[21] Appl. No.: 410,460

[22] Filed: Aug. 23, 1982

[51] Int. Cl.³ .................. B21C 47/24; B65H 35/02
[52] U.S. Cl. .................... 242/79; 242/56.8; 242/81; 414/911
[58] Field of Search ............... 242/79, 80, 81, 56.2, 242/56.8, 56.4; 225/103; 29/413, 417, 33 Q, 33 S; 414/911

[56] References Cited

U.S. PATENT DOCUMENTS

| | | | |
|---|---|---|---|
| 3,999,665 | 12/1976 | Rogers | 414/911 X |
| 4,155,238 | 5/1979 | Rogers | 29/413 X |
| 4,176,774 | 12/1979 | Rogers | 225/93 X |
| 4,191,318 | 3/1980 | Rogers | 225/103 |
| 4,195,759 | 4/1980 | Rogers | 225/103 |
| 4,267,984 | 5/1981 | Box | 225/103 X |
| 4,267,985 | 5/1981 | Rogers | 225/103 X |

Primary Examiner—Stuart S. Levy
Assistant Examiner—Katherine Jaekel
Attorney, Agent, or Firm—Kane, Dalsimer, Kane, Sullivan and Kurucz

[57] ABSTRACT

A device for separating a sheet metal coil from a cylindrical constructed form of a plurality of coils interconnected by tabs, said device comprising a turnstile with a mandrel which removes the construct from a slitting line and turns it over towards a downender assembly. A portion of the downender assembly is inserted into a support arm holding the mandrel and the construct so that a part of the construct is secured by the mandrel and a second part is secured by the downender assembly. The two parts are separated when the mandrel is pushed up from the support arm by a lifting cylinder. After separation, the coil is turned into a horizontal position by the downender assembly for further processing.

12 Claims, 18 Drawing Figures

DEVICE FOR SEPARATING A COIL OF SHEET METAL FROM A CONSTRUCT

BACKGROUND OF THE INVENTION

This invention relates to a device used in the manufacturing of rolls of flat steel strips, and more particularly for breaking such rolls off from a coil of sheet metal which has been partially slit.

Recent advances in the manufacturer of narrow sheets of flat steel have led to the development of devices which can be used to fabricate such sheets of steel very economically. One such device is described in U.S. Pat. No. 4,155,238 granted on May 22, 1979 to J. W. Rogers. A wide metal sheet rolled up in a cylindrical shape is fed into the Rogers device which has a plurality of cutting wheels which slit the sheet to form a weakened area between a number of narrower strips. The strips are coiled up on a rewind drum. The slitting is only partially completed leaving interconnecting tabs or other interconnecting portions between the adjacent strips. Thus, the rewind drum contains a construct of several strips of sheet metal all coiled up and interconnected by tabs. Before the strips can be used, they must be separated from the construct.

Although the Rogers' slitting mechanism itself proved to be very efficient there is a need for a device which can perform the operation of breaking apart the construct as soon as the slitting process is complete, in a fast and economical way. Other devices have been proposed but none of them proved to be efficient enough for a modern manufacturing operation. (See for example U.S. Pat. Nos. 4,191,318, 4,176,774 and 4,195,759).

SUMMARY OF THE INVENTION

The objective of this invention is to speed up the separation of coils of narrow sheet metal, or mults, from a construct, by providing a device which can break up the construct in a fast and economical manner.

Another objective is to provide a device which can be used selectively to break from a construct a single mult or a coil formed of a plurality of mults.

Yet another objective is to provide a device which can be used to tighten the mults once they are broken off from the construct when necessary.

These and other advantages of the invention shall become apparent in the description below.

A device built according to this invention comprises a construct support means having a cantilever arm with a free end, a separating means mounted on said arm and a holding means. The construct is placed on the arm after which the end of the arm comes in contact with the holding means which is then attached to a coil of the construct while the coil is being separated by the separating means. Advantageously, the arm may pivot horizontally between two positions, the first position being near the end of a slitting line which makes the construct, and the second position being adjacent to the holding means. The arm is in the first position while the construct is transferred from the slitter line to the arm, and in the second position during the actual separation. The construct may be transferred to the arm directly from the slitting line, or the separating device may be located away from the slitting line in which case a separate transfer means has to be used.

The holding means comprises a base and a vertically rotatable arm which holds a drum for clamping the coil during separation.

After separation, the drum is turned from the vertical to the horizontal plane to allow further processing of the coil.

DESCRIPTION OF THE PREFERRED EMBODIMENT

Figure 1:
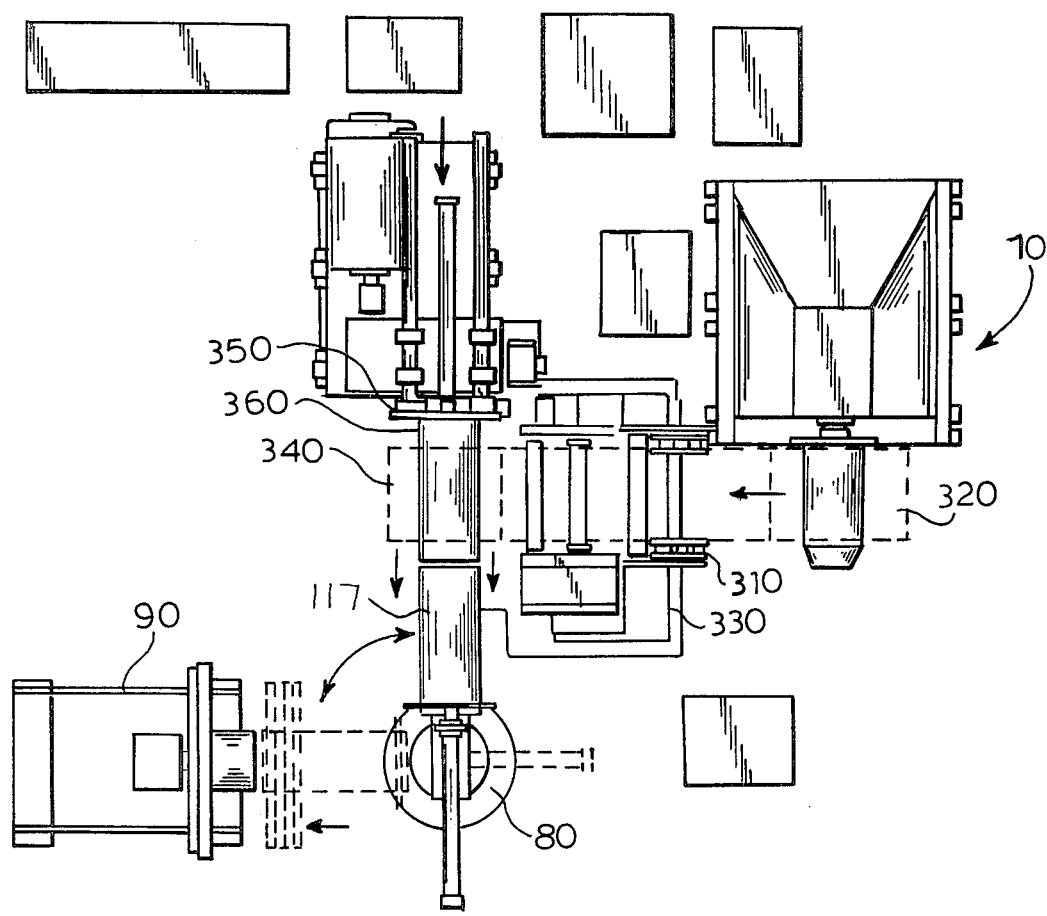
FIG. 1 is a layout for a slitting line including the invention.

A slitter line according to this invention as can be best seen in FIG. 1 comprises a mechanism 70 for slitting rolls of metal sheet, a turnstile 80 supporting an expandable mandrel and a downender assembly 90.

Figure 5A:
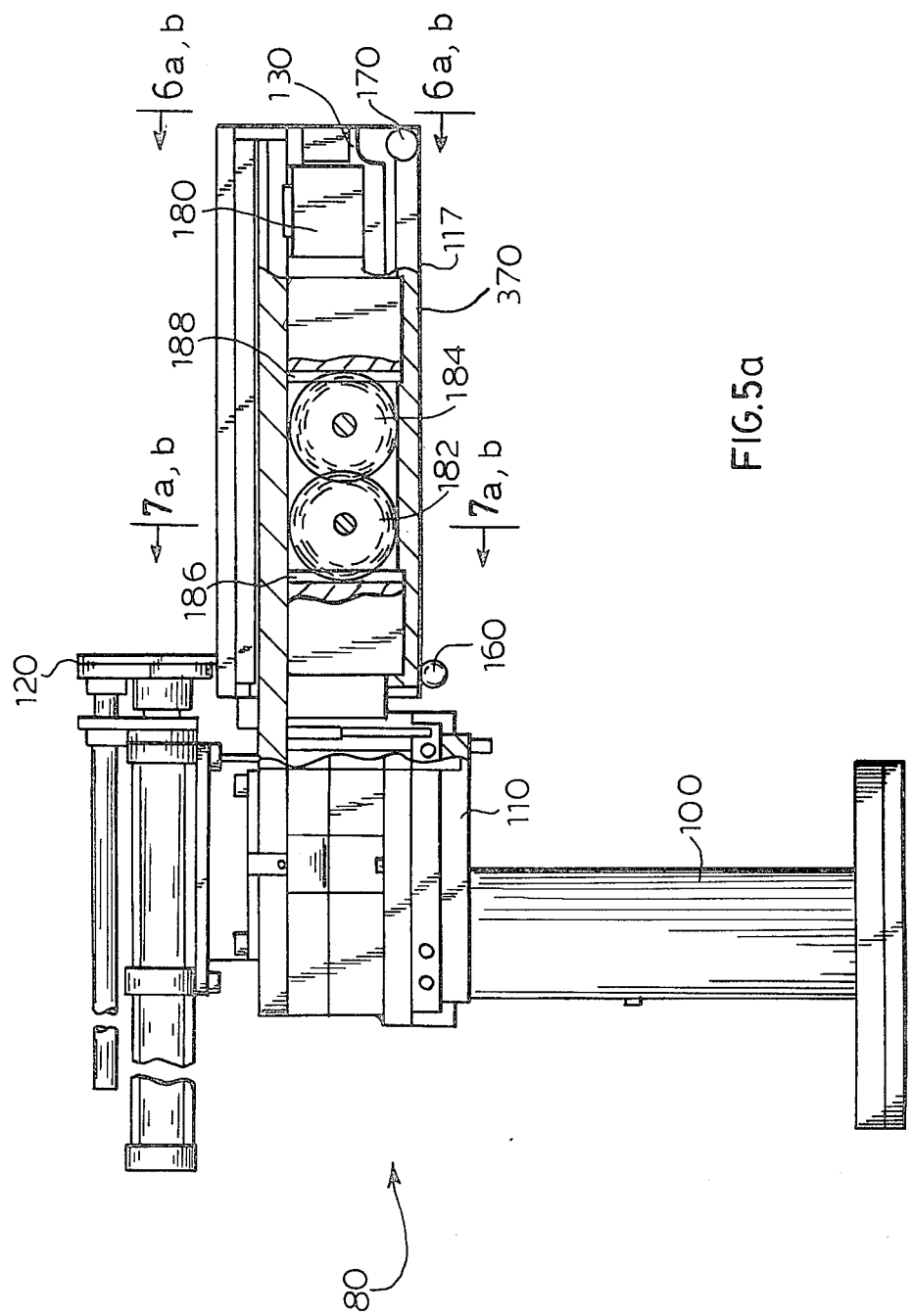
FIG. 5a is a side view of the turnstile.

The turnstile 80 shown on FIG. 5a comprises a base 100, attaching means 110 which allows a cantilevered expandable manrel 117 to turn in the horizontal plane. The turnstile 80 also possesses a pusher assembly 120.

Figure 7A:
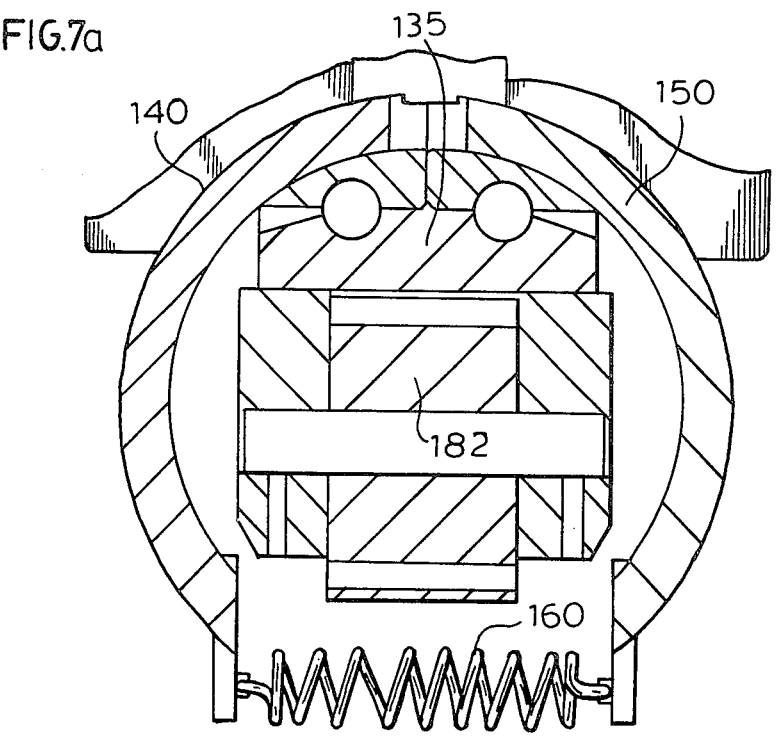
FIG. 7a is another sectional view of the mandrel.
Figure 5B:
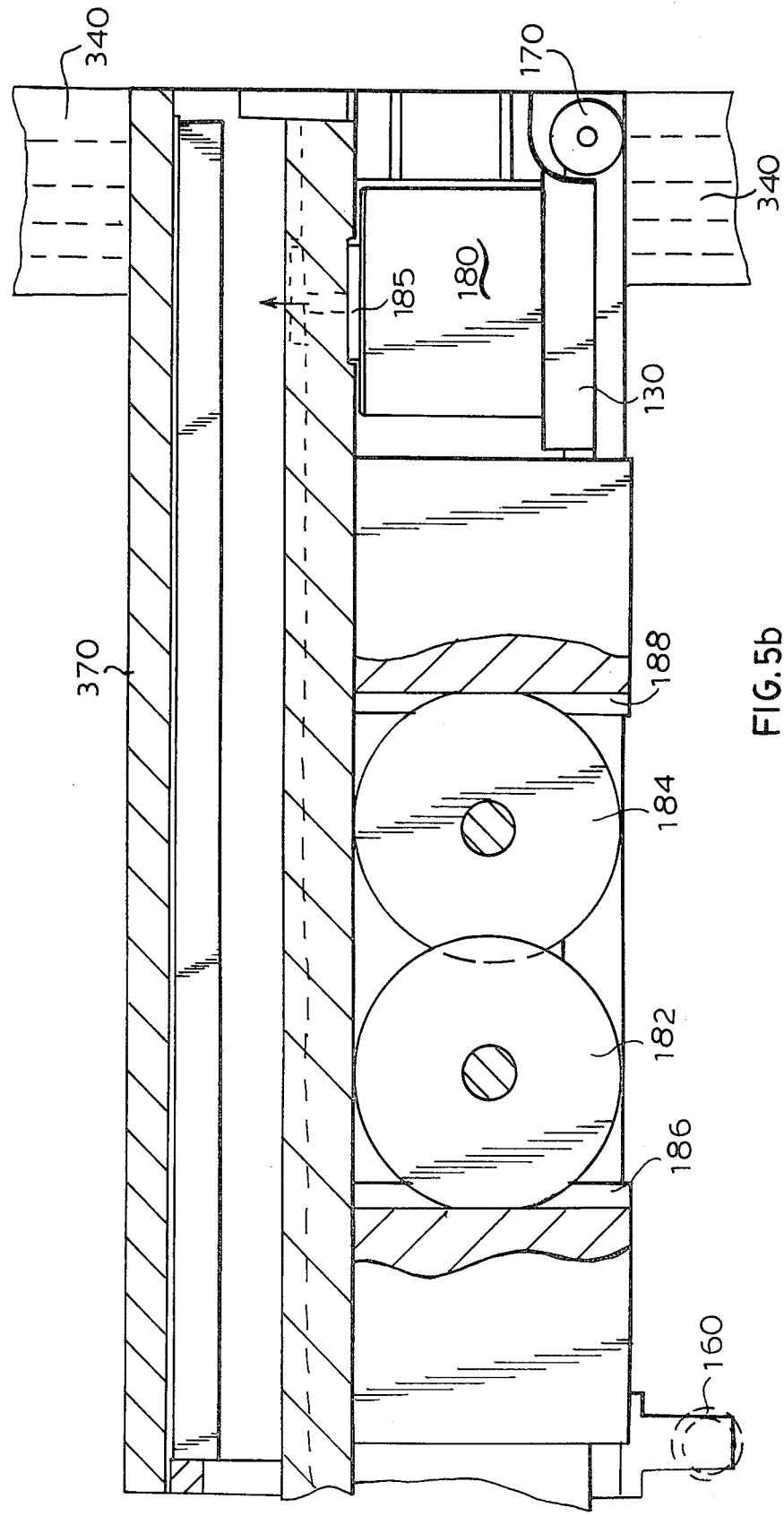
FIG. 5b shows a close-up view of the expandable mandrel.
Figure 6A:
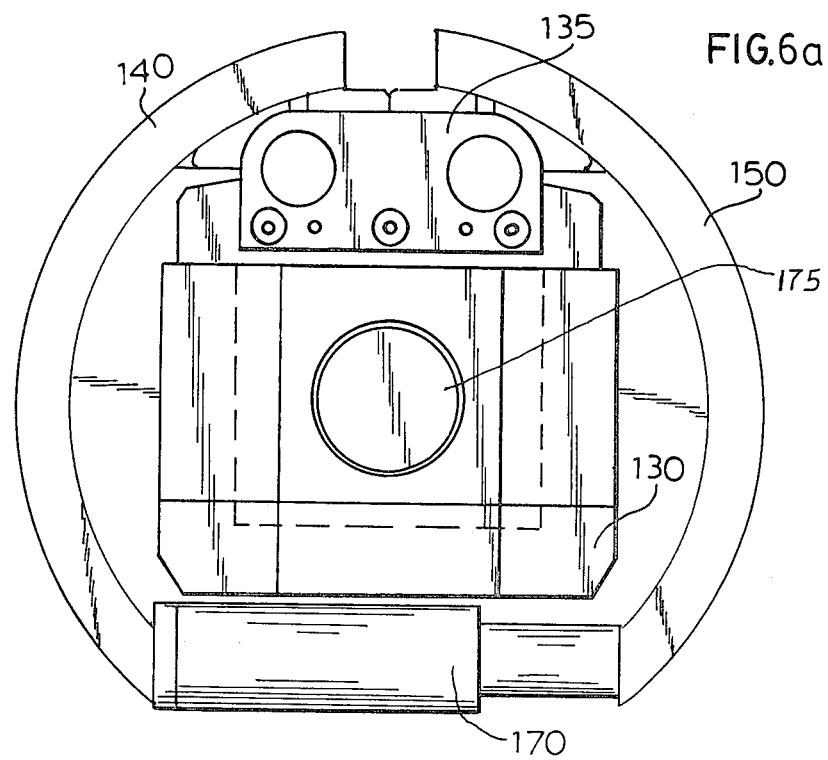
FIG. 6a is a sectional view of the mandrel taken at its free end.
Figure 6B:
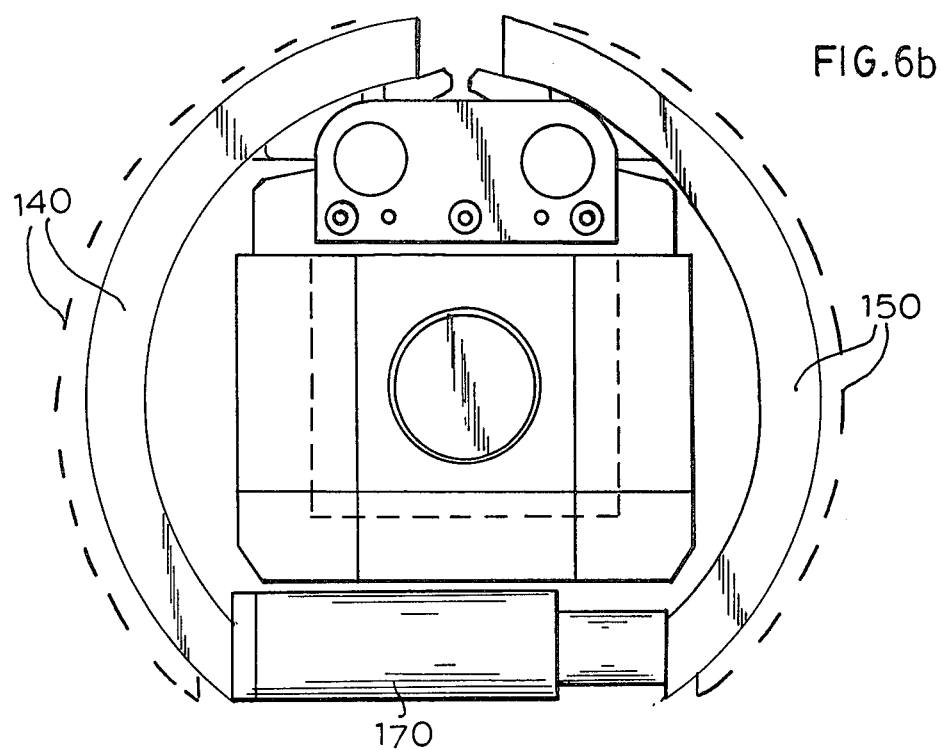
FIG. 6b shows the mandrel with the sides contracted.

The expandable mandrel comprises a support arm 130, hinged member 135 and two arctuate sides 140 and 150 which are connected to the hinged member at the top (see FIGS. 5b, 6a and 7a). Near connecting means 110, the mandrel has a spring 160 which holds the arctuate sides together. At the opposite or free end of the mandrel there is a mandrel expanding cylinder 170 which is provided to collapse and expand sides 140 and 150. FIG. 6a shows the relative positions of the sides when the mandrel is expanded while FIG. 6b shows the mandrel in its contracted configuration. At the end there is also a receiving hole 175 whose purpose shall become clear later.

On the support arm 130, close to expanding piston 170, there is a lifting cylinder 180 with piston 185 which is provided to lift the hinged member and the sides about 2" with respect to support arm 130. Since the mandrel has an elongated shape, and the lifting force of cylinder 180 is applied at the free end, a rack and pinion assembly is provided to eliminate dimensional distortion of the mandrel. This rack and pinion assembly comprises two gears 182 and 184 and two straight members 186 and 188. Gears 182 and 184 are affixed to support arm 130 while the straight members are affixed to hinged member 135.

The teeth of the two gears are intermeshed. Thus the rack and pinion assembly insures that when the lifting cylinder is activated the whole length of the two sides is lifted uniformly.

Figure 7B:
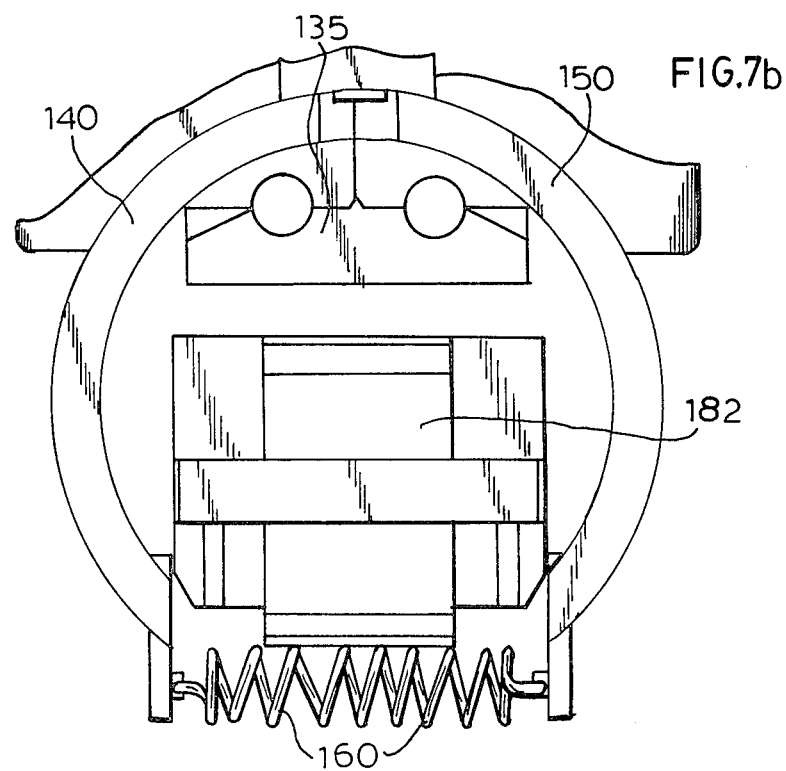
FIG. 7b shows the mandrel with the two sides lifted.

The relative positions of the mandrel components during the lifting operation are illustrated in FIGS. 7a and 7b. In 7b, the mandrel is in its lifted position.

Figure 11:
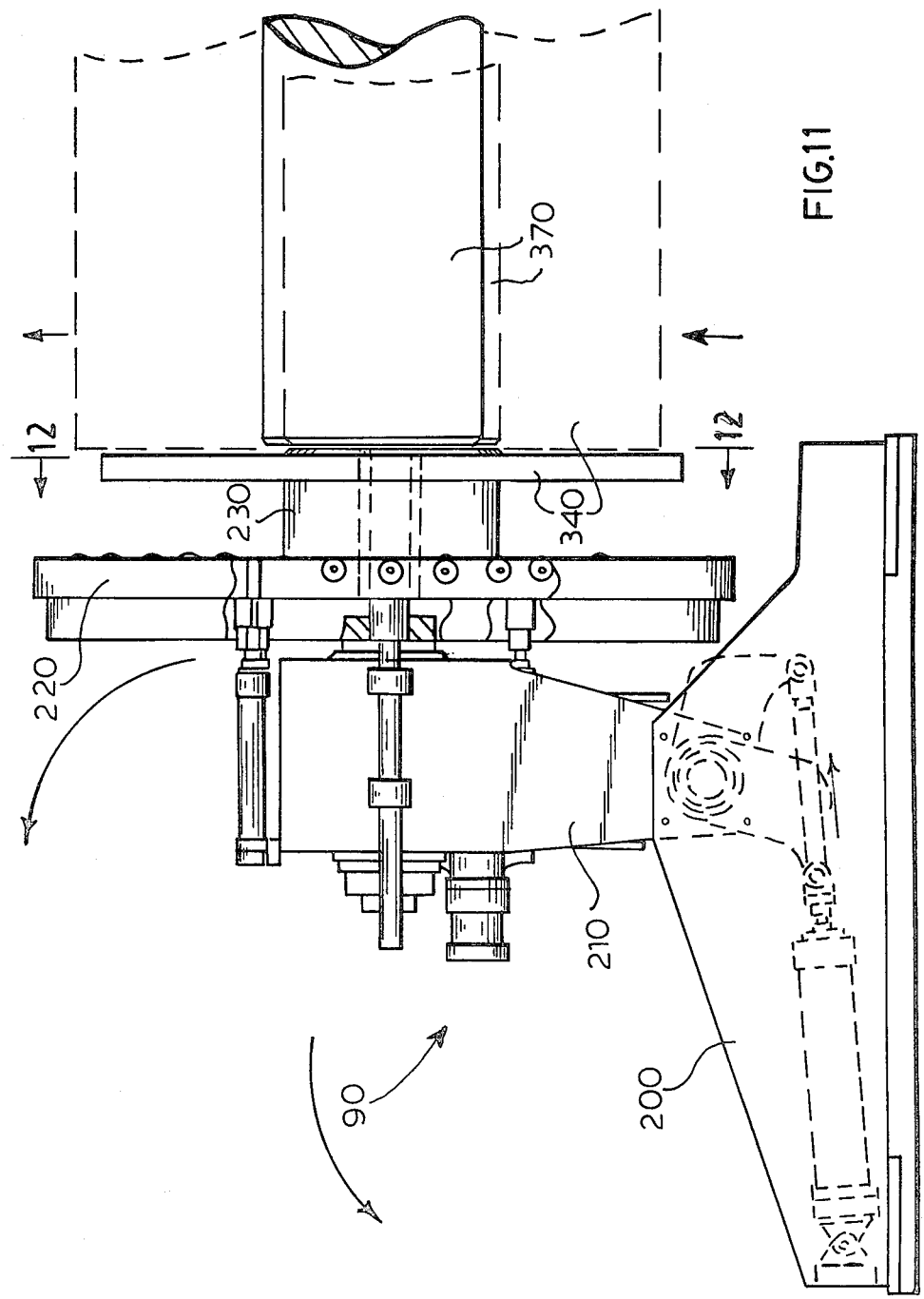
FIG. 11 shows the separation of the construct and the motion of the downender assembly thereafter.
Figure 13:
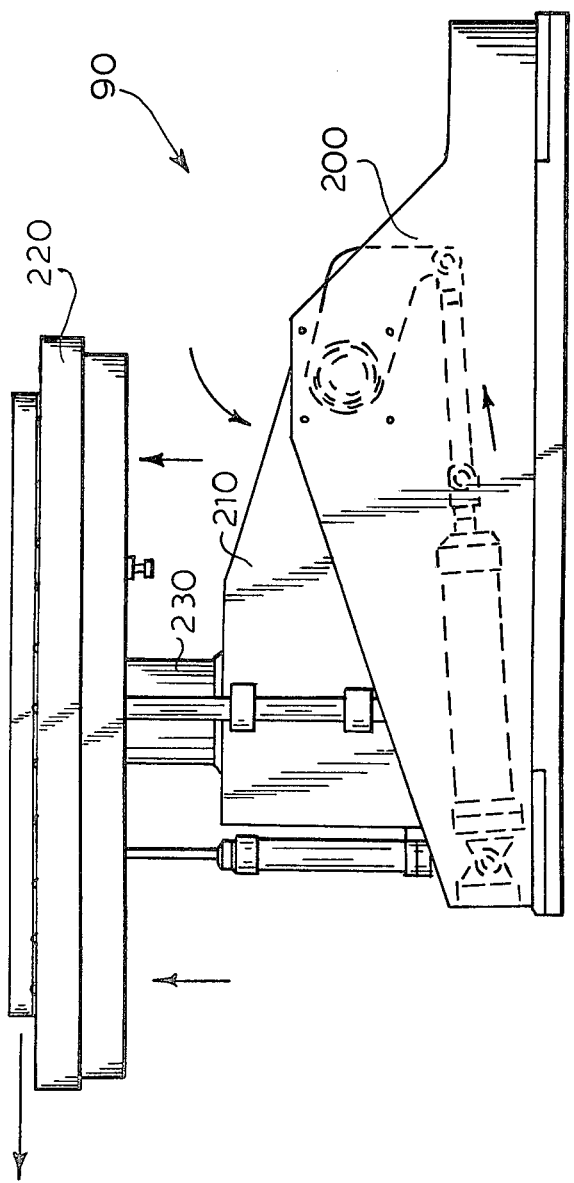
FIG. 13 shows details of the downsider assembly.

Another element of this invention is a downender assembly 90. As it can be best seen in FIG. 13, the assembly 90 comprises a base 200, a movable arm 210 and a roller table 220 movably affixed to the arm 210 so that it can be raised and lowered. Also fixed to the arm 210 is a collapsible drum 230, which passes through a circular hole made in the table 220. Thus the table 220 can move up and down without any interference from the collapsible cylindrical drum 230. The drum 230 can also move axially with respect to table 220. The table 220 can be orientated vertically as shown in FIG. 11. In this position, the table 220 is disposed close to the arm 210 so that the collapsible drum 230 can protrude through the table.

Figure 12A:
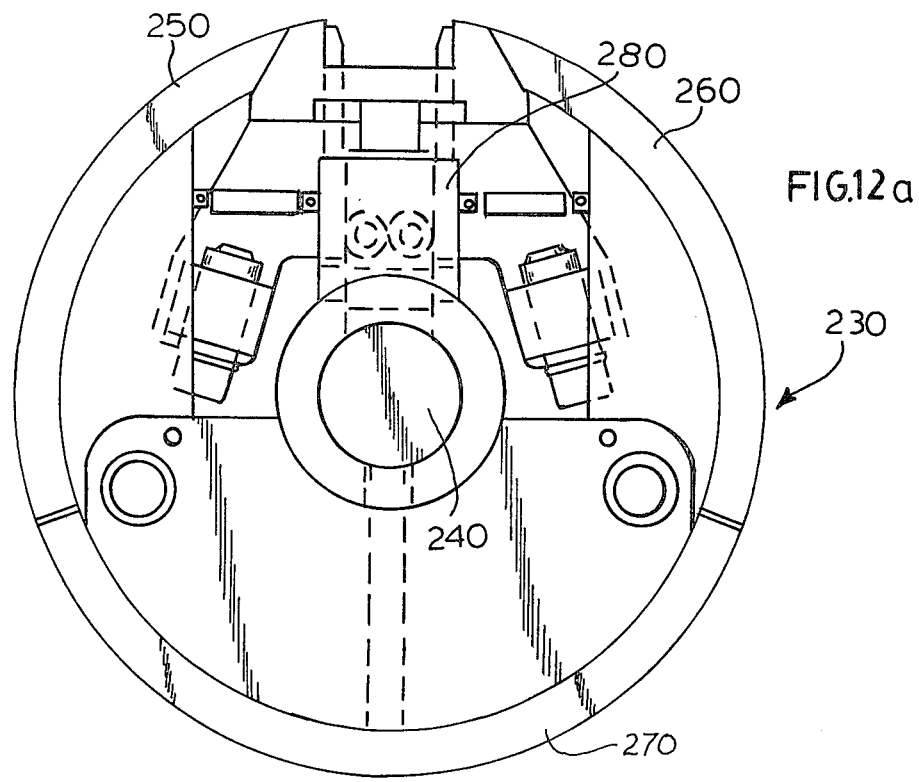
FIG. 12a shows a sectional view of the collapsible drum.

The drum 230 is terminated with an axle nose 240. As can be best seen in FIG. 12a, the drum comprises three arcuate sides 250, 260 and 270 and collapsible means 280 which is provided to reduce the outside diameter of the collapsible drum. Such collapsible means are well known in the art and therefore, need not be described.

Figure 12B:
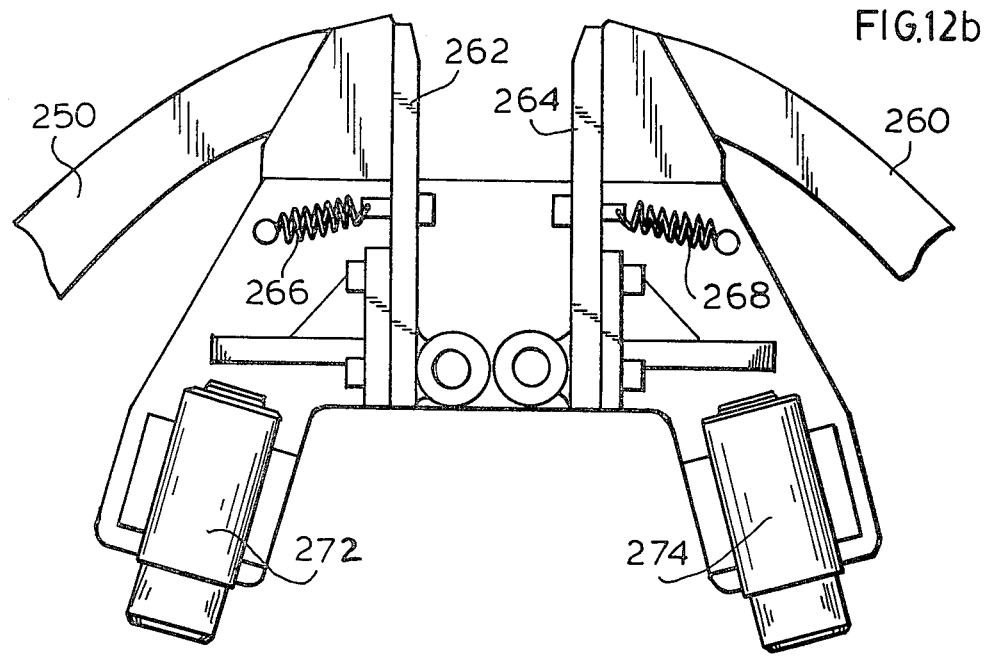
FIG. 12b shows the holding members of the drum.
Figure 12C:
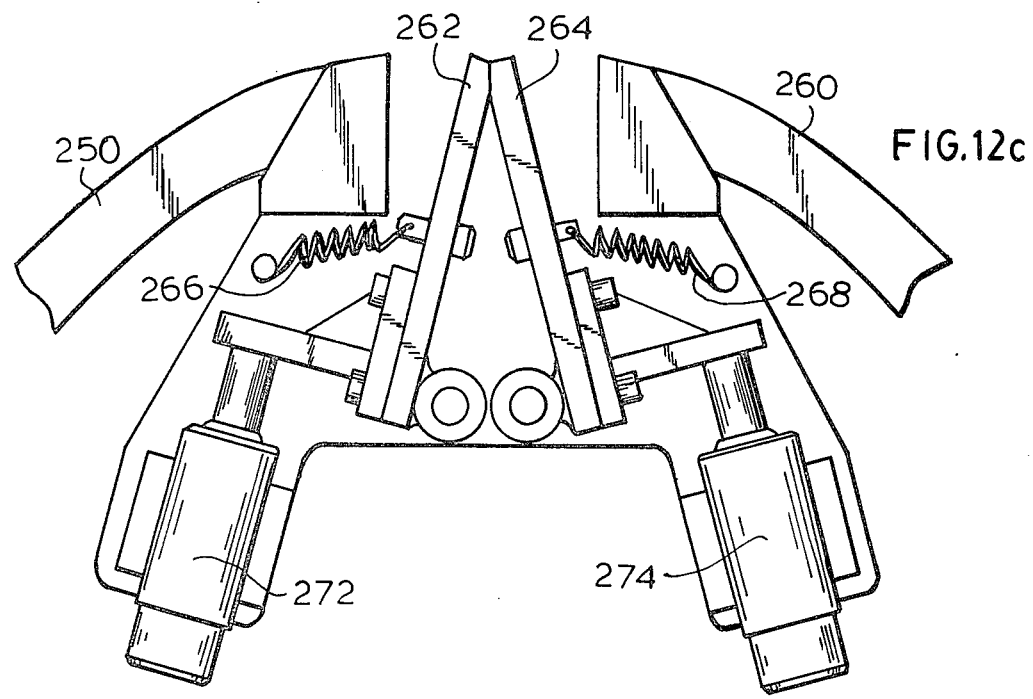
FIG. 12c shows the holding members in the closed position.

Within drum 230, there is a pair of holding members 262 and 264. These members are shown in detail in FIG. 12b. The drum also has two piston cylinders 272 and 274 which, when actuated, can force the holding members together as shown in FIG. 12c. The holding members are spring loaded in the open position by springs 266 and 268.

The function of the turnstile 80 and the downender assembly 90 shall now be described in conjunction with the slitting mechanism 70.

Figure 2:
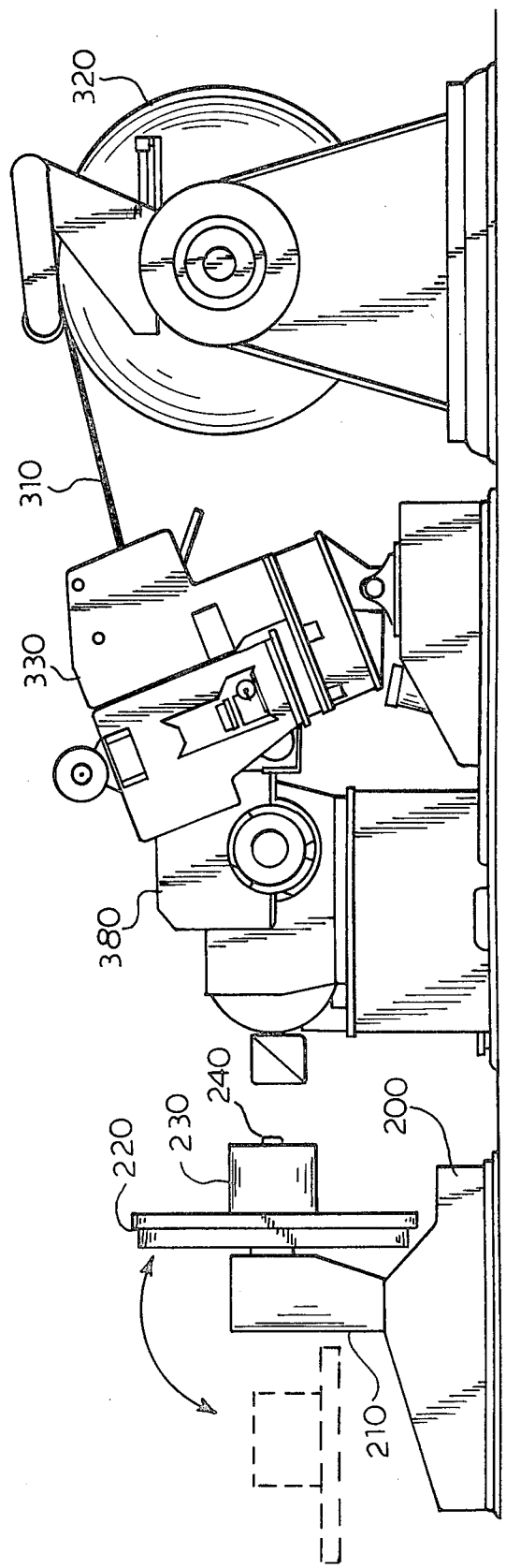
FIG. 2 is a side view of the slitting line.
Figure 3:
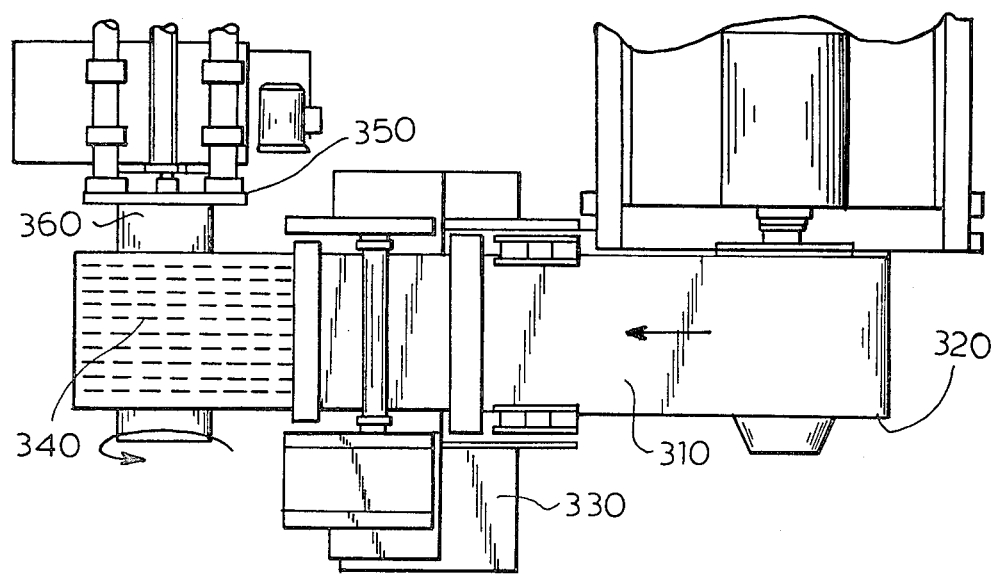
FIG. 3 is a partial top view of the slitting line showing the sheet metal being slit.
Figure 4:
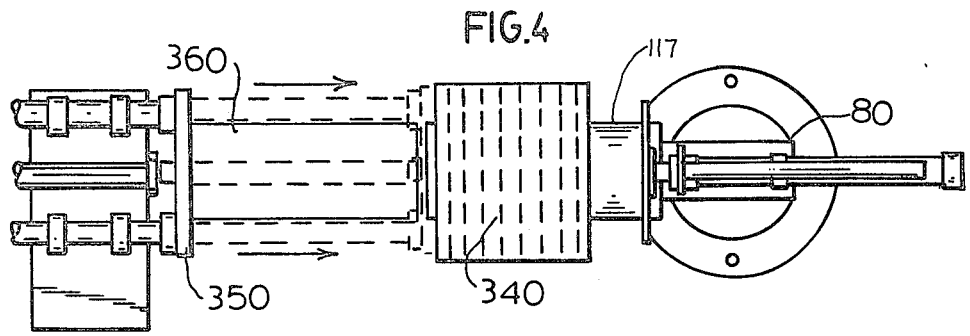
FIG. 4 shows the construct being pushed from the takeoff drum to the mandrel.

A slitter line in which the present invention is incorporated, is shown on FIGS. 1, 2 and 3. A roll of sheet metal 310 is uncoiled from the takeoff drum 320 in the direction shown by the arrow and it is slit by the knives situated in slitting device 330. The partially slit sheet is then recoiled on rewind drum 360 to form a construct 340. After the slitting operation is completed, a pusher assembly 350 is activated to push the construct from the rewind drum to the expandable mandrel 117 of the turnstile 80 as indicated by the arrows (FIGS. 4).

Of course, if the separating device described herein is located remotely from the slitting line 70, the construct 340 is unloaded and transported by other means such as a hi-lo.

This phase is made possible by the fact that the sides of the mandrel 117 are collapsed.

Figure 8:
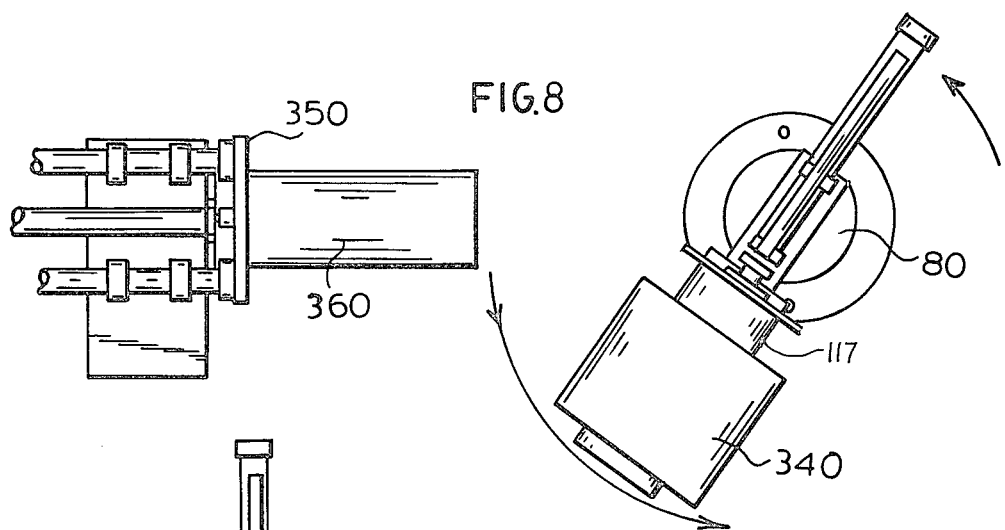
FIG. 8 shows the mandrel in transition between the take-off drum and the downender assembly.

Next, the mandrel 117 swings (FIGS. 1 and 8) toward the downender assembly 90 which then is rotated until the axis of the drum 230 is horizontal (FIG. 2).

Figure 9:
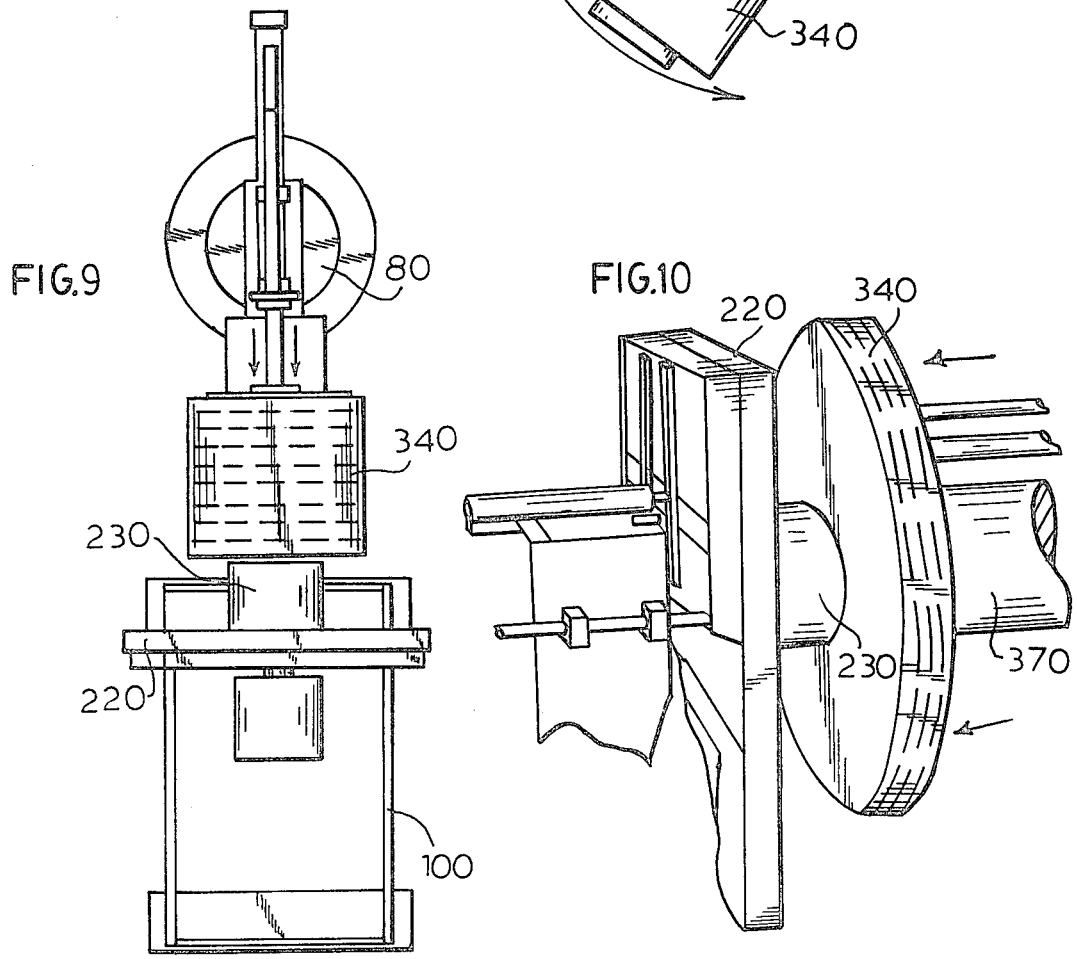
FIG. 9 shows the construct being positioned on the mandrel and the collapsible drum.
Figure 10:
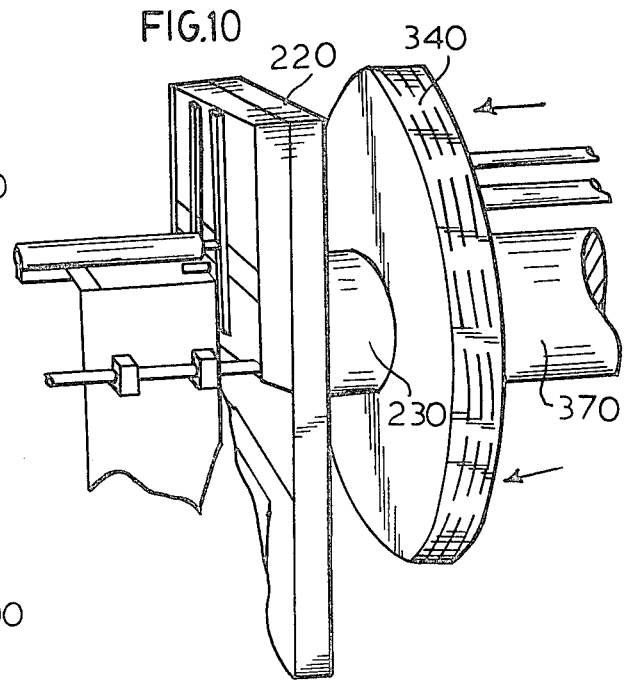
FIG. 10 is a side view of the construct shown in FIG. 9.

At this point, the expandable mandrel 117 holding the construct 340 and the collapsible drum 230 are oriented co-axially to each other as shown on FIG. 9. Now the collapsible drum 230 is ready to receive a coil(s) or mult(s). The drum 230 (which as pointed out before, can be moved co-axially) moves forward until its axle nose 240 is disposed within the receiving hole 175 of the mandrel support arm 130. Thus the mandrel support arm 130 is supported at one end by the turnstile 80 and at the other by the downender assembly 90. Next, the construct 340 is pushed toward the downender assembly 90 by the pusher assembly 120 until the desired number of mults are resting on the collapsible drum 230. The expandable drum 230 is expanded by opening its sides to hold rigidly the portion of the construct which has been pushed off the mandrel 117; and the mandrel 117 is pushed upwards by the vertical lifting cylinder thus separating the construct at the plane between the mandrel 117 and the drum 230 by shearing the respective tabs.

Once the separation is complete, the axle nose 240 is retracted from the receiving hole 175, and the roller table 220 together with the drum 230 is turned back to the horizontal position. The mult being held by the roller table 220 may now be tightened if necessary by holding the outside of the mult rigidly to the table 220 and the inside end of the mult by holding members 262 and 264 and then rotating the drum 230.

After the tightening is complete, the drum 230 is collapsed and the mult is lifted off vertically from the drum 230 by the vertical movement of the roller table 220. Now the mult is ready to be rolled away for further processing such as banding, tagging, packaging etc.

Once the mult is removed from the table 220, the breaking-off operation may be repeated until the whole construct has been broken up. While this is going on, the slitter device 70 can go on making more constructs.

It will be immediately apparent to one skilled in the art that this device could be used to break off the mults from the construct one at a time, or in any combination desired.

Furthermore, since the mults or the construct do not have to be physically touched by the operators, the slitter line can be operated very safely and with a minimum of effort.

It is also apparent that the operation itself is fast. The construct is pushed from the rewind drum 230 to the expandable mandrel 117. The mandrel 117 and the downender assembly 90 turn towards each other, the drum 230 is connected to the mandrel 117 by the axle nose 240 and the construct is pushed toward the drum 230. The mult(s) is broken off by raising the mandrel 117. The drum, 230 while carrying the mult disengages from the mandrel 117, turns back to the horizontal position. The drum 230 then tightens the mult, the mult is removed and the drum 230 is ready for the next mult.

Numerous modifications may be made to this device without departing from the spirit of the invention.

I claim:

1. A device for separating coils from a construct of a plurality of wound coils axially connected by weakened areas therebetween the device comprising:

a support means having a cantilevered arm on which the construct is disposed and having a free end;

a separating means mounted on said arm at the free end; and a holding means which is associated with the free end for holding a coil of the construct while said coil is axially separated, and for moving the separated coil away from said support means.

2. The device of claim 1 wherein the holding means comprises a collapsible drum which holds the coil during separation.

3. The device of claim 2 wherein the holding means further comprises:

a base, and a movable arm which holds the collapsible drum wherein during the separation of the coil the drum is in a horizontal position and wherein the arm moves the drum and the coil thereon to a vertical position.

4. The device of claim 3 wherein the holding device further comprises a roller table having a hole larger than the drum and also being held by the arm, said roller table and drum being axially movable with respect to each other, with the drum passing through the hole.

5. The device of claim 4 wherein the drum has an axis and is rotatable around that axis.

6. The device of claim 1 wherein the cantilevered arm has an expandable mandrel which is expanded prior to separation to secure the construct.

7. The device of claim 6 wherein the support means also comprises a turning means provided for turning the cantilevered arm from a first position where the arm is adapted to be associated with a slitting line which makes the construct to a second position next to the holding means, whereby the construct is loaded from the slitting line to the arm when said arm is in said first position and whereby the separation takes place when said arm is in the second position.

8. In a slitting line which partially slits a wide strip of sheet metal into strips which are wound up in axially spaced coils interconnected to form a cylindrical construct, said construct having an axial hole, and being formed on a take up drum, said take up drum being associated with a first pushing means which is provided to push off a construct from the take up drum comprising:

a turnstile having a cantilever support arm with a free end on which there is disposed an expandable mandrel and a lifting cylinder placed between the support arm and the mandrel;

said support arm also having a second push off means provided for pushing off the construct from the mandrel;

said support arm being movably mounted on said turnstile so that it can be moved horizontally from a first position to a second position and back;

said mandrel being movably mounted on said arm in the vertical direction; and a downender assembly having a base, a vertically movable arm, and an expandable and collapsible drum disposed on said arm, said drum being movable axially with respect to said support arm;

wherein said drum can be moved by the support arm from a first position where the drum's axis is horizontal to a second position where the drum's axis is vertical;

means for affixing said drum to said support arm in said first position of the drum, and wherein said expandable and collapsible drum holds at least part of the construct in its expanded position.

9. The device of claim 8 wherein the downender assembly also comprises a roller table having a hole through which the collapsible drum is disposed.

10. The device of claim 9 wherein the roller table has holding means for holding an end of the coil, and means for rotating the drum after the drum is secured to said coil while the coil is affixed to the roller table by said holding means to tighten the coil separated from the construct.

11. A method of separating the coils of a construct formed of a plurality of axially spaced coils which are interconnected by tabs, said construct being produced by a slitting line comprising the steps of:

moving the construct from the slitting line to a cantilevered arm having a free end, for supporting said construct axially;

turning said arm horizontally toward a support means;

securing the free end to said support means;

sliding said construct toward the support means so that at least one of its coils is supported by said support means; and lifting the arm up to shear off the tabs connecting the coil resting on the support means to the rest of the construct.

12. The method of step 11 further comprising of the step of tightening the separated coil.

* * * * *